United States Patent [19]

Ono

[11] 4,398,095
[45] Aug. 9, 1983

[54] WAVE ACTIVATED POWER GENERATION SYSTEM

[75] Inventor: Yasuo Ono, Gifu, Japan

[73] Assignee: Kawasaki Jukogyo Kabushiki Kaisha, Kobe, Japan

[21] Appl. No.: 286,053

[22] Filed: Jul. 22, 1981

[30] Foreign Application Priority Data

Jul. 22, 1980 [JP] Japan .................................. 55/100379
Jul. 22, 1980 [JP] Japan .................................. 55/100380
Jul. 22, 1980 [JP] Japan .................................. 55/100381
Jul. 25, 1980 [JP] Japan .................................. 55/102989

[51] Int. Cl.³ ............................................. F03B 13/12
[52] U.S. Cl. ....................................... 290/53; 60/497; 417/333
[58] Field of Search ................... 290/42, 53; 417/330, 417/331, 333; 60/496, 497, 507

[56] References Cited

U.S. PATENT DOCUMENTS 4,218,192 8/1980 West .................................... 417/333

*Primary Examiner*—J. V. Truhe
*Assistant Examiner*—Shelley Wade
*Attorney, Agent, or Firm*—Kerkam, Stowell, Kondracki & Clarke

[57] ABSTRACT

A wave activated power generation system of the float type comprising at least one piston-cylinder device having an anchored cylinder and a piston slidable in the cylinder and cooperating with the cylinder to form a pumping chamber above the piston and a low pressure chamber below the piston. The cylinder has an intake port and an exhaust port both formed at an upper portion thereof to communicate with the pumping chamber and each provided with a check valve. A float is connected through a cable to the piston of the piston-cylinder device. A pair of fluid storages are connected to the intake port and the exhaust port of the pumping chamber, respectively. A waterwheel generator is driven by the fluid flowing from one of the fluid storages to another. A pressure regulating device is connected to the low pressure chamber so as to maintain the low pressure chamber at a pressure lower than the pressure in the pumping chamber, the difference in pressure ceaselessly applying a downward force on the piston to keep the cable in a tensed condition.

26 Claims, 13 Drawing Figures

WAVE ACTIVATED POWER GENERATION SYSTEM

This invention relates to a wave activated power generation system which converts the energy of waves to electric energy, and more particularly to such a system of the type using floats.

Wave activated power generation systems which convert the energy of waves in the sea to electric energy are generally divided into the air turbine type and the float type. The term "sea" used herein includes not only oceans but also lakes. In the air turbine type of wave activated power generation system, an air box is anchored so as to have its upper part above the surface of the sea and to have a lower opening below the surface of the sea so that an air chamber is formed by the box and the sea surface. By repeated vertical displacement of the sea surface in the air chamber caused by ocean waves, the air is alternately expelled from and sucked into the air chamber to generate a flow of air which in turn drives an air turbine connected to an electric power generator. This system is advantageous in that the number of moving parts is relatively small so that possibility of trouble in operation is relatively small. However, the efficiency of conversion of wave energy into electric energy is relatively low, and expensive and large-scale equipment is required.

On the other hand, the float type of wave activated power generation system is based on the principle that it is possible to extract wave energy by using a float anchored by a mooring cable. Alternate upward and downward displacement of the sea surface caused by the ocean waves will cause variation in the buoyancy acting on the anchored float. The variation in buoyancy causes variation in the tensile force acting on the mooring cable and is transmitted to a hydraulic piston-cylinder device which pumps fluid to a reservoir. The fluid supplied from the reservoir drives a waterwheel type generator.

In conventional wave activated power generation systems of the float type, the float is merely anchored through a mooring cable and a piston-cylinder device, and there is no means for keeping the mooring cable in a tensed condition irrespectively of the level of the surface of the sea. Therefore, when the level of the sea surface lowers with the passing of the trough of a wave, the float does not lower by the full extent of the drop of the sea surface, but, is apt to move horizontally with the waves, so that the amount of the vertical movement of the piston is small as compared with the actual vertical displacement of the sea surface caused by the waves. Namely, the energy conversion efficiency is low.

Accordingly, in order to achieve a high energy conversion efficiency, it is necessary not only to ceaselessly maintain the mooring cable in a tensed condition but also to restrain the float in the horizontal direction. For this purpose, it has been proposed to provide a tensile spring in the mooring cable. However, this has many defects including the fact that the durability of the spring in seawater is inevitably insufficient.

In addition, the tidal level periodically varies. For example, assume that the range of tide is equal to or greater than the length of a possible maximum stroke of the piston connected to the float. If an optimum length of the mooring cable is set at the full tide, when the tide is at the ebb the mooring cable will greatly loosen, so that the energy conversion efficiency is greatly decreased. On the other hand, if the optimum length of the mooring cable is set at the ebb tide, when the tide is at the full the float will be substantially under the sea surface so that the piston connected to the float will substantially stay at its top dead point. In any case, therefore, it is necessary to adjust the length of the mooring cable in accordance with the variation of the tidal level so as to ensure that the mooring cable is ceaselessly kept in a tensed condition and the float and hence the piston are allowed to vertically displace in accordance with actual variation in the sea surface caused by the waves. Furthermore, when a large amount of flotages are driven to the sea area where the wave activated power generation system is installed, and when weather is stormy, it is necessary to prevent damage of the float. However, there has been neither a float provided with means for adjusting the length of the mooring cable nor a means capable of protecting the float from flotages and stormy weather.

Accordingly, it is an object of this invention to provide an improved wave activated power generation system of the float type which is very simple in construction and which has high energy conversion efficiency.

It is another object of this invention to provide such a wave activated power generation system in which a cable connected to a float is ceaselessly maintained in a tensed condition so that the float is effectively restrained from free horizontal movement.

It is a further object of this invention to provide such a wave activated power generation system which can be located on the bottom of the sea or in the sea.

It is a still further object of this invention to provide a wave activated power generation system in which a substantial portion of the system including a generator can be located on land.

It is still another object of this invention to provide a wave activated power generation system in which a substantial portion of the system including a generator is located in a waterproof capsule as one unit so that the system can be easily installed under the water.

It is a still further object of this invention to provide a wave activated power generation system which can be installed in a sea area not having a sufficient depth of water.

It is still another object of this invention to provide a float type wave activated power generation system in which the length of the mooring cable can be adjusted in accordance with variation in the tidal level and to perfectly submerge the float so as to avoid flotages or stormy weather.

According to this invention, there is provided a wave activated power generation system of the float type which comprises at least one piston-cylinder means having an anchored cylinder and a piston slidable in the cylinder and cooperating with the cylinder to form a first chamber above the piston and a second chamber below the piston, the cylinder having an intake port and an exhaust port both formed at an upper portion thereof to communicate with the first chamber and each provided with a check valve means. A float means is connected through a cable to the piston of the piston-cylinder means. A first fluid storage means is connected to the intake port of the first chamber for supplying the first chamber with a fluid under a first pressure and a second fluid storage means is connected to the exhaust port of the first chamber to receive the fluid supplied from the first chamber. The second fluid storage means is adapted to cause a second pressure higher than the first pressure to act on the check valve of the exhaust port of the first chamber. A waterwheel generator is connected at its inlet to the second fluid storage means and at its outlet to the first fluid storage means so that the generator is driven by the fluid flowing from the second fluid storage means to the first fluid storage means. A pressure regulating means is connected to the second chamber for maintaining the second chamber at a third pressure lower than the first pressure, so that the difference in pressure between the first and second chambers ceaselessly applies a downward force on the piston to maintain the cable in a tensed condition.

With the above arrangement, since the mooring cable is ceaselessly maintained in a tensed condition, when the float is elevated with the passing of the crest of a wave, the piston of the piston-cylinder means is caused to upwardly move by the amount of the actual vertical displacement of the sea surface. At this time, since the check valve of the intake port is closed and the check valve of the exhaust port is opened, the fluid in the first chamber is expelled through the exhaust port to the second fluid storage means. When the sea surface drops with the passing of the wave bottom, since the mooring cable and hence the float are ceaselessly downwardly pulled by the downward force acting on the piston because of the difference in pressure between the first and second chambers, the float lowers without any substantial horizontal displacement by an amount substantially equal to the amount of the actual vertical displacement of the sea surface, and the piston is downwardly moved by the same amount because of the downward force acting on the piston. At this time, since the check valve of the exhaust port is closed and the check valve of the intake port is opened, the fluid is introduced from the first fluid storage means through the intake port to the first chamber. As a result, the piston is moved downwardly and upwardly by the full extent of the vertical displacement of the sea surface so as to pump fluid from the first fluid storage means to the second fluid storage means, thereby keeping the continuous flow of fluid from the second fluid storage means through the waterwheel generator to the first fluid storage means. Therefore, the energy of waves is converted to electric energy with high energy conversion efficiency.

According to a first aspect of this invention, the pressure regulating means is a low pressure tank communicating at an upper portion thereof with the atmosphere and adapted to have a free water surface lower than the surface of the sea so as to supply the second chamber with water of the third pressure lower than the first pressure. In this case, the low pressure tank may open to the atmosphere through a duct extending from the upper portion of the low pressure tank to a position higher than the surface of the sea. In addition, the low pressure tank is preferably provided with pump means for draining the water from the tank so as to prevent elevation of the water level in the tank caused by the water leaking from the first chamber into the second chamber of the piston-cylinder means, so that the free water surface in the tank is maintained at a suitable level so as to keep the difference in pressure between the first and second chambers at a constant value. But, the pump means may be used to positively adjust the water level in the tank so as to change the pressure in the second chamber, thereby changing the downward force applied by the difference in pressure between the first and second chambers. Furthermore, one waterwheel generator may be associated with a plurality of piston-cylinder means each of which is connected to one float, the second chamber of each piston-cylinder means being interconnected to one another. In this case, if the flow of water expelled from and introduced into the second chamber of each piston-cylinder means by the reciprocation of the associated piston balances one another, the second chamber of each piston-cylinder means may open directly to the atmosphere without using the low pressure tank.

In a first embodiment of the wave activated power generation system in accordance with the first aspect, the exhaust port of the piston-cylinder means and the inlet of the waterwheel generator open to the sea so that the water surrounding the piston-cylinder means acts as the second fluid storage means. The first fluid storage means is an intermediate pressure tank connected to the outlet of the waterwheel generator and adapted to supply the first chamber with water of the first pressure lower than the head at the exhaust port of the piston-cylinder means. In this case, the intermediate pressure tank may be located above the first chamber of the piston-cylinder means to communicate at an upper portion thereof with the atmosphere so as to have a free water surface lower than the surface of the sea but higher than the free water surface in the low pressure tank. Furthermore, the generator and the low pressure tank may be located in a waterproof housing, and the intermediate pressure tank may be located at an intermediate portion of a tower projecting upwardly from the waterproof housing and emerging from the surface of the sea. This waterproof housing may be installed on the bottom of the sea, or may be supported together with said piston-cylinder means by a structure which floats in the sea.

This first embodiment is particularly suitable in the case of installing the wave activated power generation station at a sea area a relatively long distance away from the seashore and having a depth of water from 100 m to 300 m.

In a second embodiment in accordance with the first aspect, the first fluid storage means is a first reservoir located at an elevation higher than the surface of the sea and the second fluid storage means is a second reservoir located at an elevation higher than the first reservoir, the waterwheel generator being located at an elevation between the first and second reservoirs so that the generator is driven by a flow of fluid falling down from the second reservoir to the first reservoir. In this case, the fluid is circulated from the second reservoir through the generator and through the first reservoir to return through the first chamber of the piston-cylinder means to the second reservoir. Therefore, fresh water in which it is easy to prevent development of microorganism and which also is easy to purify can be used as the circulating fluid.

In a third embodiment, the intake port of the piston-cylinder means and the outlet of the waterwheel generator open to the sea so that the water surrounding the piston-cylinder means acts as the first fluid storage means, and the second fluid storage means is a reservoir located at an elevation higher than the surface of the sea, the waterwheel generator being located at an elevation between the surface of the sea and the reservoir so that the generator is driven by the falling water from the reservoir to the sea. In this case, the intake port of the piston-cylinder may be open to the sea through a filter means.

In a fourth embodiment, the second fluid storage means is a high pressure tank pressurized by a compressed gas so that a pressure higher than the pressure of the water surrounding the piston-cylinder means acts on the check valve of the exhaust port of the piston-cylinder means. In this case, the first fluid storage means may be a reservoir located on land. In addition, since a fluid is also circulated from the high pressure tank, through the waterwheel generator and through the reservoir and further through the piston-cylinder means to the high pressure tank, fresh water can be used as the circulating fluid.

According to the second, third and fourth embodiments, the generator and the reservoir or the tank acting as the second fluid storage means are located on land. In addition, the reservoir acting as the first fluid storage means is also located on land in the second and fourth embodiments, and a reservoir or tank acting as the first fluid storage means is not required in the third embodiment. Therefore, a substantial portion of the system can be located on land. Since the reservoir located at a high elevation or the high pressure tank is used as the second fluid storage means, the system can be installed at a sea area not having sufficient depth of water, differently from the first embodiment.

According to a second aspect of this invention, the second chamber of the piston-cylinder means opens to the sea so that the water surrounding the piston-cylinder means acts as the pressure regulating means. In one embodiment of the second aspect, the first fluid storage means is a first reservoir located at an elevation higher than the surface of the sea and the second fluid storage means is a second reservoir located at an elevation higher than the first reservoir, the waterwheel generator being located at an elevation between the first and second reservoirs so that the generator is driven by a falling fluid from the second reservoir to the first reservoir. In another embodiment of the second aspect, the first fluid storage means is an intermediate pressure tank pressurized by a compressed gas at an intermediate pressure higher than the pressure of the water surrounding the piston-cylinder means and the second fluid storage means is a high pressure tank pressurized by a compressed gas at a pressure higher than the intermediate pressure. The waterwheel generator is connected at its inlet to the high pressure tank and at its outlet to the intermediate pressure tank so that the generator is driven by a fluid flowing from the high pressure tank to the intermediate pressure tank because of the difference in pressure between the high pressure and intermediate pressure tanks. In this case, the waterwheel generator and the intermediate pressure and high pressure tanks can be located on land or in a waterproof housing installed in the sea. Furthermore, the intermediate pressure tank may be provided with pump means for supplying supplementary water to the intermediate pressure tank so as to compensate for leakage of water from the tanks.

According to a third aspect of this invention, the pressure regulating means is a low pressure tank pressurized by a compressed gas so as to supply the second chamber with a fluid of a pressure lower than the first pressure in the first chamber. In one embodiment of the third aspect, the exhaust port of the piston-cylinder means and the inlet of said waterwheel generator open to the sea so that the water surrounding the piston-cylinder means acts as the second fluid storage means, and the first fluid storage means is an intermediate pressure tank connected to the outlet of the waterwheel generator and pressurized by a compressed gas to supply the first chamber with water of a first pressure lower than the head at the exhaust port of the piston-cylinder means. In another embodiment of the third aspect, the first fluid storage means is an intermediate pressure tank pressurized by a compressed gas so as to supply the first chamber with a fluid of the first pressure and the second fluid storage means is a high pressure tank pressurized by a compressed gas to cause a pressure higher than the first pressure to act on the check valve of the exhaust port of the first chamber. In this case, the intermediate and high pressure tanks may be installed together with the generator on the land, or may be located together with the low pressure tank and the generator in a waterproof housing anchored in the water.

In this embodiment, since the low pressure, intermediate pressure and high pressure tanks pressurized by a compressed gas are used as the pressure regulating means and the first and second fluid storage means, respectively, the wave activated power generation system can be installed at any sea area without limitation due to the depth of water.

According to a fourth aspect of this invention, the float includes a hollow float member, and winding drum located within the hollow float member and driven by an electric motor, the cable being wound around the drum and extending through a lower portion of the hollow float member to the piston of the piston-cylinder means. With the arrangement, the electric motor is controlled to adjust the length of the mooring cable between the float and the piston in accordance with variation in the tidal level, so as to ensure that the mooring cable is ceaselessly maintained in a tensed condition and that the float and the piston are allowed to vertically displace in accordance with the vertical displacement of the sea surface caused by the passing of waves. In this case, a water level detector may be provided so as to operate the motor when the amount of variation in the sea level exceeds a predetermined value. In addition, the electric motor is controlled so as to put the float at a sufficient depth under the sea surface in order to cause the float to avoid a stormy weather or a large amount of flotages driven to the sea area where the system is installed.

The above and other objects, features and advantages of this invention will become apparent from the following descriptions of preferred embodiments with reference to the accompanying drawings in which the same portions are given the same reference numerals through all of the drawings.

Figure 1:
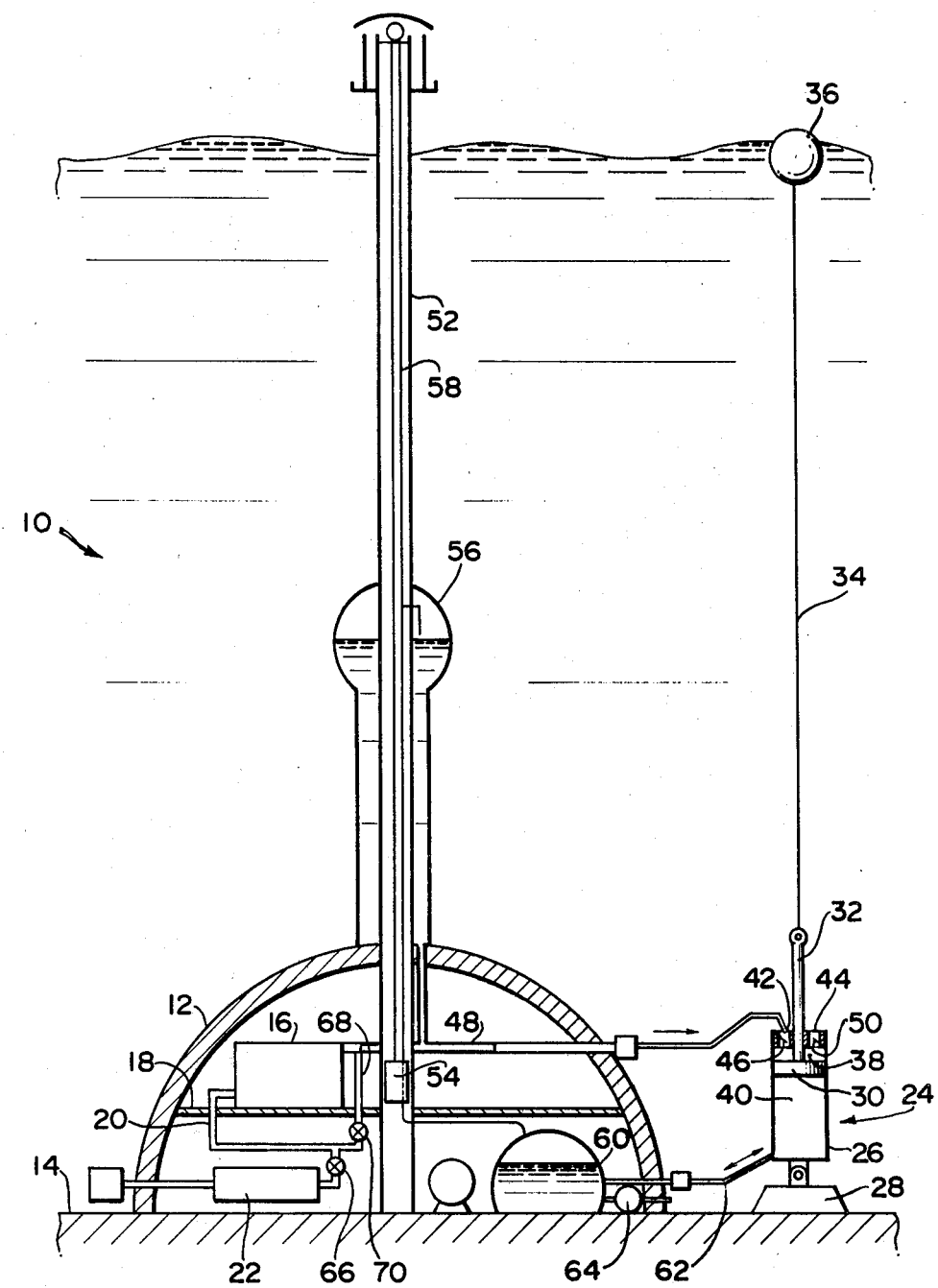
FIG. 1 is a partially omitted sectional view of a first embodiment of the wave activated power generation system in accordance with this invention.
Figure 2:
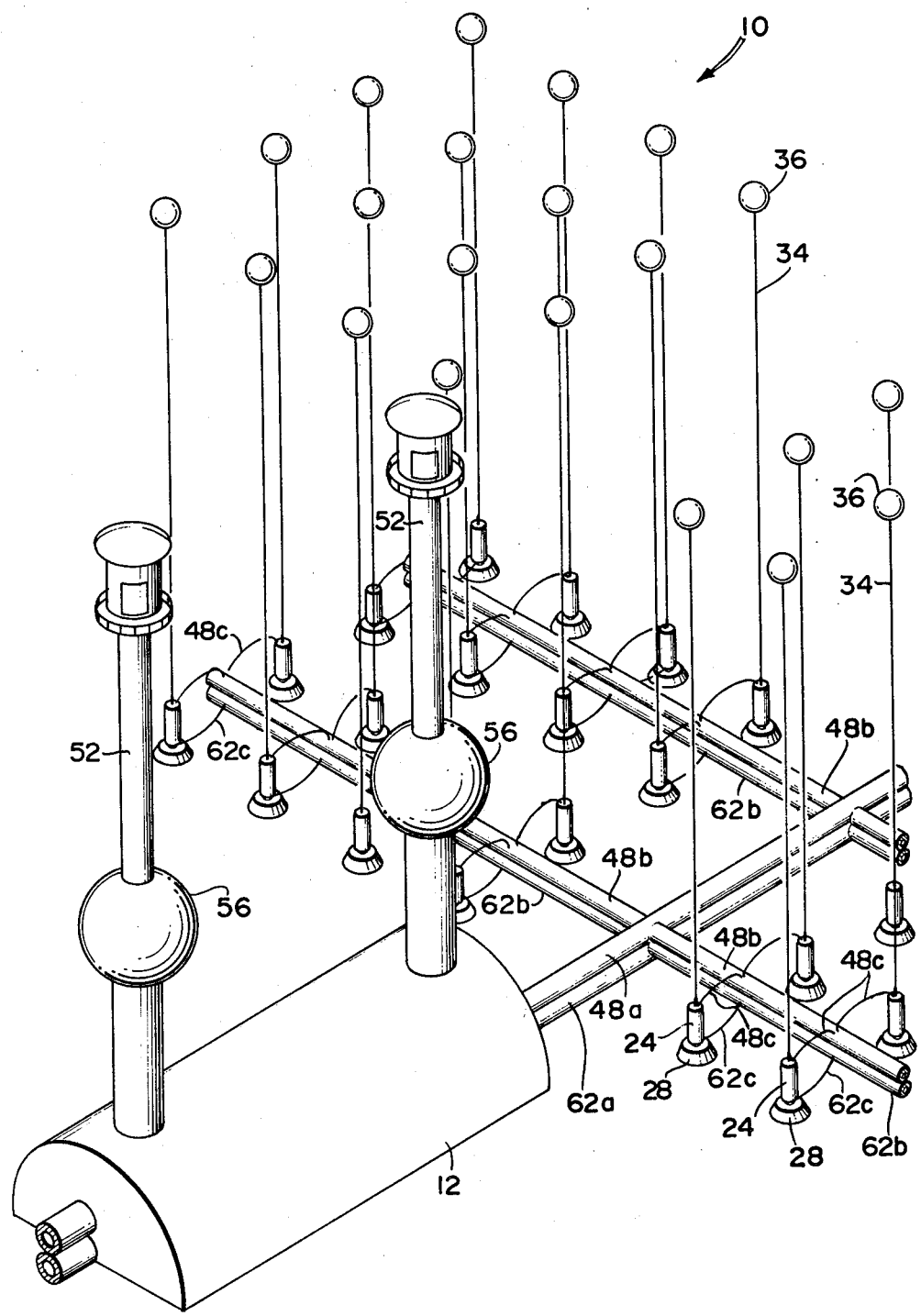
FIG. 2 is a partially omitted perspective view of the system shown in FIG. 1.

Referring to FIGS. 1 and 2, there is shown a wave activated power generation system 10 constructed in accordance with this invention. This system 10 comprises a wterproof housing 12 installed on the sea bottom 14. Within the housing 12, a waterwheel generator 16 is located on a support floor 18. The waterwheel generator 16 has a water intake port communicating through a water intake pipe 20 and a filter 22 with the sea. The system 10 also includes a plurality of piston-cylinder devices 24 located at the outside of the housing 12. Each piston-cylinder device 24 has a cylinder 26 connected at a lower end thereof to a weight 28 located on the sea bottom 14 and a piston 30 slidably reciprocatable in the cylinder 26 and connected through a piston rod 32 and a mooring cable 34 to a float 36 which is located to be floating on the sea. The space in the cylinder 26 is divided by the piston into a pumping chamber 38 above the piston and a pressure regulating chamber 40 below the piston. The cylinder 26 has an intake port 42 and an exhaust port 44 both formed at an upper portion thereof to communicate with the pumping chamber 38. The intake port 42 is provided with a check valve 46 adapted to open when the water is introduced into the pumping chamber 38 and is connected through an exhaust pipe 48 to an exhaust port of the waterwheel generator 16. The exhaust port 44 is a provided with a check valve 50 adapted to open when the water is exhausted from the pumping chamber 38. This exhaust port 44 opens to the sea.

As shown in detail in FIG. 2, the exhaust pipe 48 comprises a main exhaust pipe 48a connected to the exhaust port of the waterwheel generator 16, branched exhaust pipes 48b extending sidewardly from each side of the main pipe 48a at constant intervals along the main pipe 48a, and connection pipes 48c extending from each branched pipe 48b at constant intervals along the branched pipe and connected to the intake ports of the respective piston-cylinder devices. Assuming that the number and capacity of the piston-cylinder devices associated with each branched pipe 48b are the same, the amount of the flow in the main pipe and the branched pipe decreases toward their terminal end at a constant rate. Therefore, each pipe is preferably designed from the view point of material saving such that the diameter of each pipe is varied so that the ratio of the diameter of the maximum flow amount portion to the diameter of the minimum flow amount portion is about 10:4. In this case, the pipe diameter may be varied continuously or incrementally.

The waterproof housing 12 has a pair of towers 52 extending upwardly from an upper portion thereof and projecting above the surface of the sea. Within each tower 52 there is located an elevator 54 movable from within the housing 12 to an upper end of the tower. An intermediate pressure tank 56 is formed at an intermediate portion of each tower 52. This intermediate pressure tank 56 is connected at a lower portion thereof to the exhaust pipe 48 which connects the exhaust port of the waterwheel generator to the intake port 42 of each piston-cylinder device 24. The tank 56 communicates at an upper portion thereof with the atmosphere through an air pipe 58 extending upwardly within the tower 52. The level of the water in the tank 56 is adapted to be lower than the surface of the sea. This level of water in the tank 56 determines the head acting on the intake port 42 of the pumping chamber 38. A pressure regulating low pressure tank 60 is located in the housing 12. This tank 60 is connected at a lower portion thereof to the pressure regulating chamber 40 of each piston-cylinder device 24 through a low pressure pipe 62, and also communicates at an upper portion thereof with the atmosphere through the pipe 58. Similarly to the exhaust pipe 48, the low pressure pipe 62 comprises a main pipe 62a connected to the low pressure tank 60, branched pipes 62b extending sidewardly from each side of the main pipe 62a at constant intervals along the main pipe, and connection pipes 62c extending from each branched pipe 62b at constant intervals along the branched pipe and connected to the pressure regulating chambers 40 of the respective piston-cylinder devices.

In addition, since the water leaks from the pumping chamber 38 through the clearance between the piston 30 and the cylinder 26 into the pressure regulating chamber 40 and ultimately enters through the pipe 62 into the low pressure tank 60, the low pressure tank 60 is provided with a drain pump 64 for keeping the water level in the tank 60 within a predetermined range which is sufficiently lower than the water level in the intermediate pressure tank 56.

With the above arrangement, since the head acting on the water intake port of the waterwheel generator 16 is higher than the head acting on the exhaust port of the generator 16 which is determined by the water level in the intermediate pressure tank 56, the difference in head produces a stream of water flowing through the waterwheel 16, so that the generator is driven by the stream of water. The water flowing into the intermediate pressure tank 56 is drained by the pumping action of the piston-cylinder device 24 caused by the waves so that the water level in the tank 56 is maintained constant. However, since the wave energy varies, it is expected that the drain capability of the piston-cylinder device 24 varies in accordance with variation in the wave energy, with the result that the water level in the tank 56 varies. Therefore, in order to adjust the amount of variation in the water level in the tank 56, a flow amount adjusting valve 66 may be provided in the water intake pipe 20, or a bypass pipe 68 provided with a valve 70 may be connected between the intake pipe 20 and the exhaust pipe 48.

Since the head determined by the water level in the tank 56 acts in the pumping chamber 38 and the head determined by the water level in the tank 60 which is lower than that in the tank 56 acts in the pressure regulating chamber 40, the difference in head ceaselessly applies a downward force on the piston 30 so that the mooring cable is ceaselessly maintained in a tensed condition. This downward force and hence the difference in head are determined such that about one-third of the float 36 is under the sea surface when the sea surface lowers and about two-thirds of the float 36 is under the sea surface when the sea surface elevates.

Next, explanation will be made of other embodiments, but, as mentioned hereinbefore, portions which are the same as the portions which have been already explained herein are given the same references, and explanation of their construction and function will be omitted.

Figure 3:
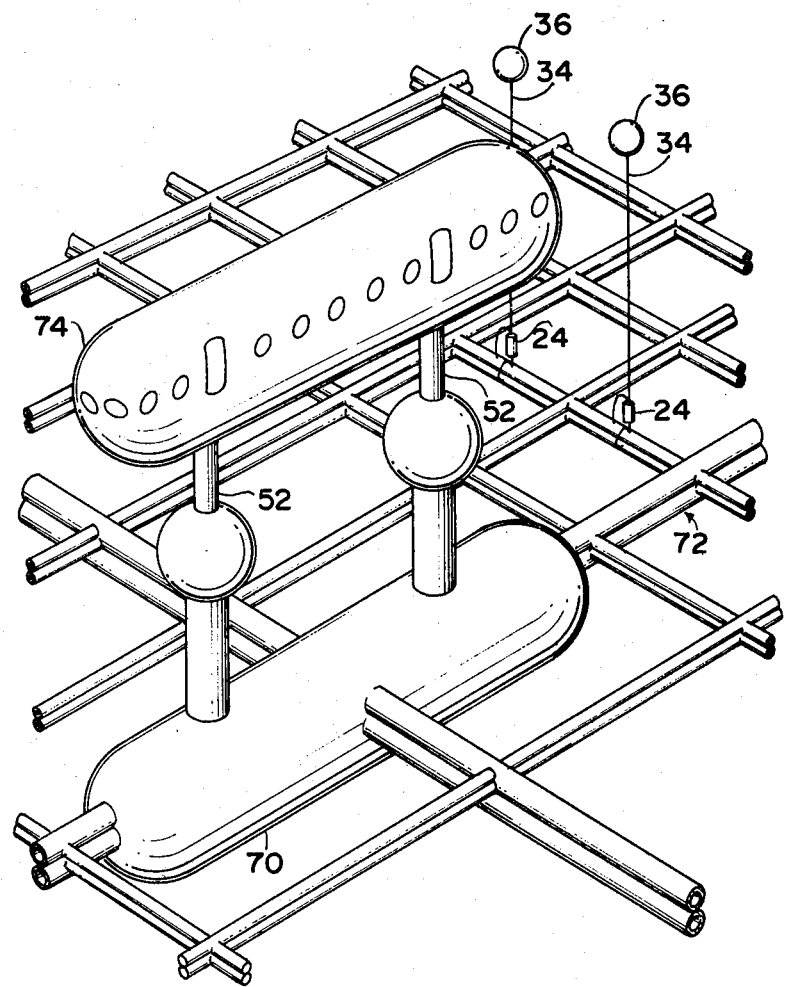
FIG. 3 is a view similar to FIG. 2 but showing a second embodiment of the wave activated power generation system in accordance with this invention.

FIG. 3 shows a modification of the system shown in FIGS. 1 and 2. In this embodiment, a waterproof housing 70 is installed on a frame structure 72 floating in the sea. A living capsule 74 for operators is provided on the top of the towers 52. This capsule 74 functions as a float in emergency. In addition, the exhaust pipe and the low pressure pipe may be piped in the floating frame structure 72, or a portion of the floating frame 72 can be used as the exhaust pipe and the low pressure pipe.

Figure 4:
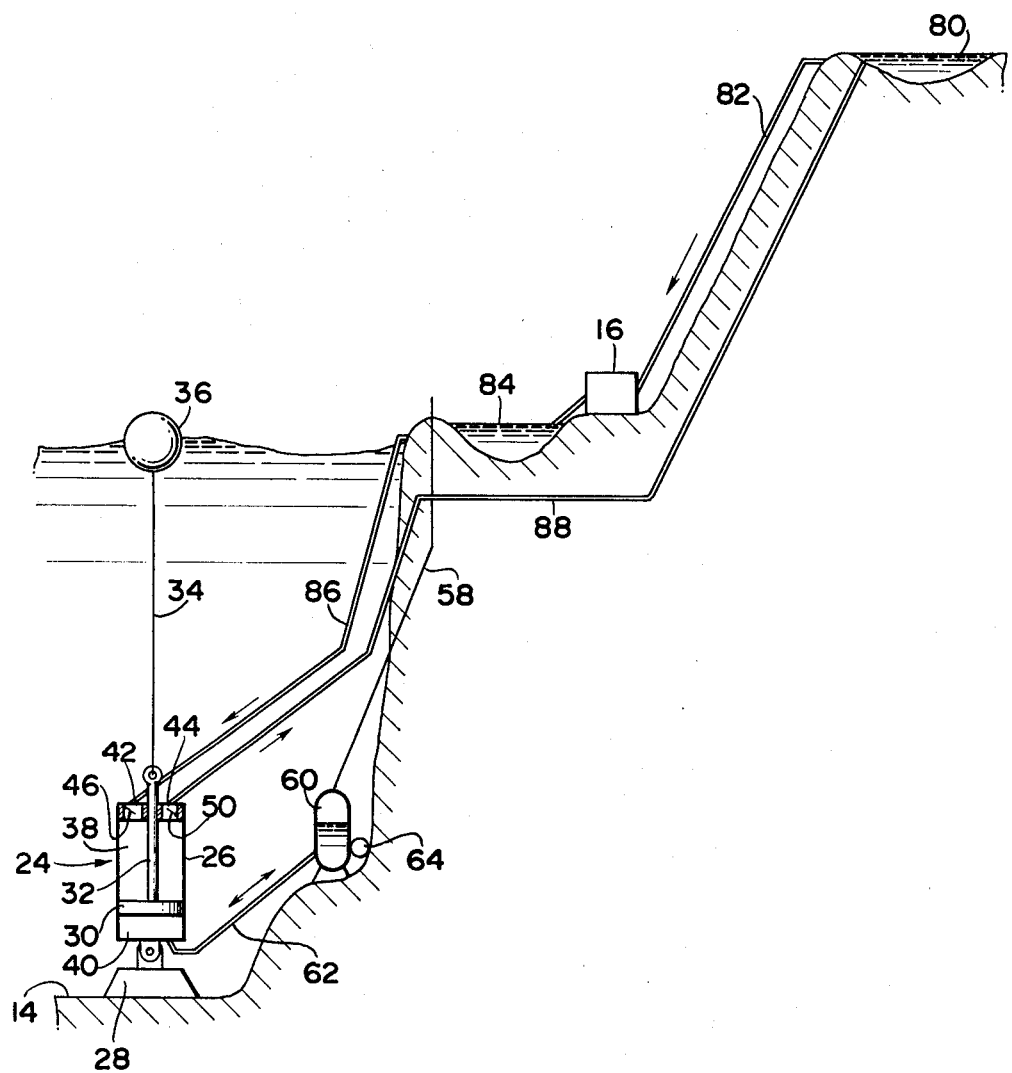
FIG. 4 is a schematic sectional view of a third embodiment of the wave activated power generation system.

Referring to FIG. 4, there is shown another embodiment of the wave activated power generation system. In this embodiment, a high elevation reservoir 80 is located on high land near the sea and the waterwheel generator 16 is located beside the sea so that the generator is driven by water falling through a water pipe 82 from the reservoir 80. The water exhausted from the waterwheel generator 16 is stored in a low elevation reservoir 84 formed beside the sea.

The intake port 42 of the pumping chamber 38 of the piston-cylinder device 24 is connected through a water pipe 86 to the low elevation reservoir 84, and the exhaust port 44 of the pumping chamber 38 is connected through a water pipe 88 to the high elevation reservoir 80. The pressure regulating low pressure tank 60 is located on the sea bottom having substantially the same depth as that of the piston-cylinder device 24. This tank 60 communicates at an upper portion thereof with the atmosphere through the air pipe 58 and is connected at a lower portion thereof to the pressure regulating chamber 40 of the piston-cylinder device 24. The free water level in the tank 60 is kept at a suitable level sufficiently lower than the water level in the low elevation reservoir 84, by the action of the associated drain pump 64.

With the above arrangement, since the head determined by the water level in the low elevation reservoir 84 and acting in the pumping chamber 38 is always higher than the head determined by the water level in the pressure regulating tank 60 and acting in the pressure regulating chamber 40, the difference in head ceaselessly applies a downward force on the piston 30 so that the mooring cable is maintained in a tensed condition. In this case, the position of the tank 60 can be determined in accordance with the necessary downward force. Furthermore, the drain pump 64 can be used to positively adjust the water level in the tank 60 so as to change the difference in head and hence the downward force acting on the piston 30. Althernately, the tank 60 may be omitted and the pressure regulating chamber 40 may be made open directly to the atmosphere through the air pipe 58. In this case, the air pipe may be provided with a drain pump to adjust the water level in the air pipe.

Thus, the float 36 connected to the downwardly tensed cable 34 vertically displaces in accordance with the actual vertical displacement of the sea surface caused by the waves, so as to greatly reciprocate the piston 30. Therefore, the piston-cylinder device 24 draws the water by suction from the low elevation reservoir 84 and pumps up the water to the high elevation reservoir 80 so that the generator 16 continues to be driven by the falling water from the high elevation reservoir 80. In this case, the circulated water is preferably fresh water.

Figure 5:
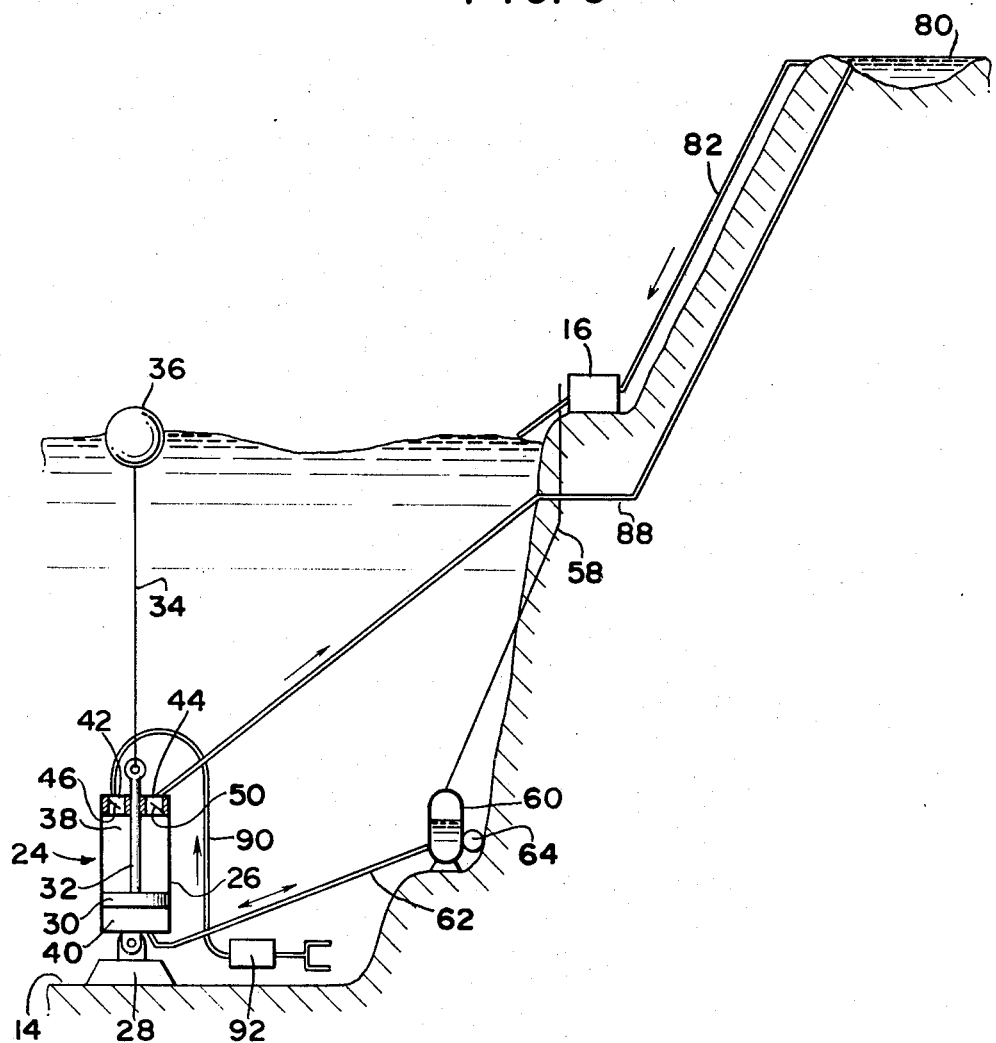
FIG. 5 is a view similar to FIG. 4 but showing a fourth embodiment.

FIG. 5 shows a modification of the system shown in FIG. 4. In this embodiment, no low elevation reservoir is provided. Instead, the water exhausted from the waterwheel generator 16 is discharged directly to the sea, and the intake port 42 of the piston-cylinder device 24 is caused to communicate to the sea through an intake pipe 90 and a filter 92. In this case, therefore, the sea water is sucked into the pumping chamber 38 and is forcedly fed to the high elevation reservoir 80.

Figure 6:
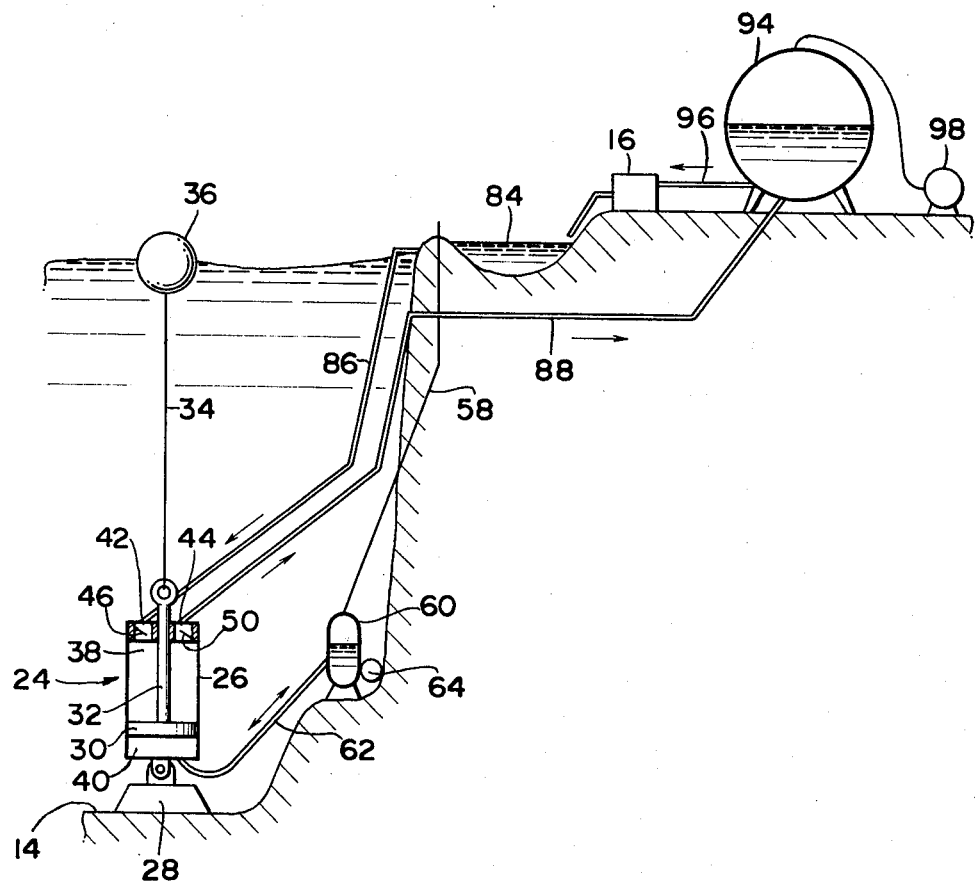
FIG. 6 is a view similar to FIG. 4 but showing a fifth embodiment.

Referring to FIG. 6, there is shown another modification of the system shown in FIG. 4. In this embodiment, a high pressure tank 94 is provided instead of the high elevation reservoir. This tank 94 is connected at a lower portion thereof to the pipe 88 connected with the exhaust port 44 of the piston-cylinder device 24 and to a feed pipe 96 for supplying water to the waterwheel generator 16. The tank 94 is also connected at an upper portion thereof to a compressor 98 so that the tank 94 is ceaselessly kept in a pressurized condition by a compressed gas from the compressor 98. With this arrangement, the water in the tank 94 is supplied through the pipe 96 to the generator 16 because of the pressure in the tank 94, thereby driving the generator 16.

Figure 7:
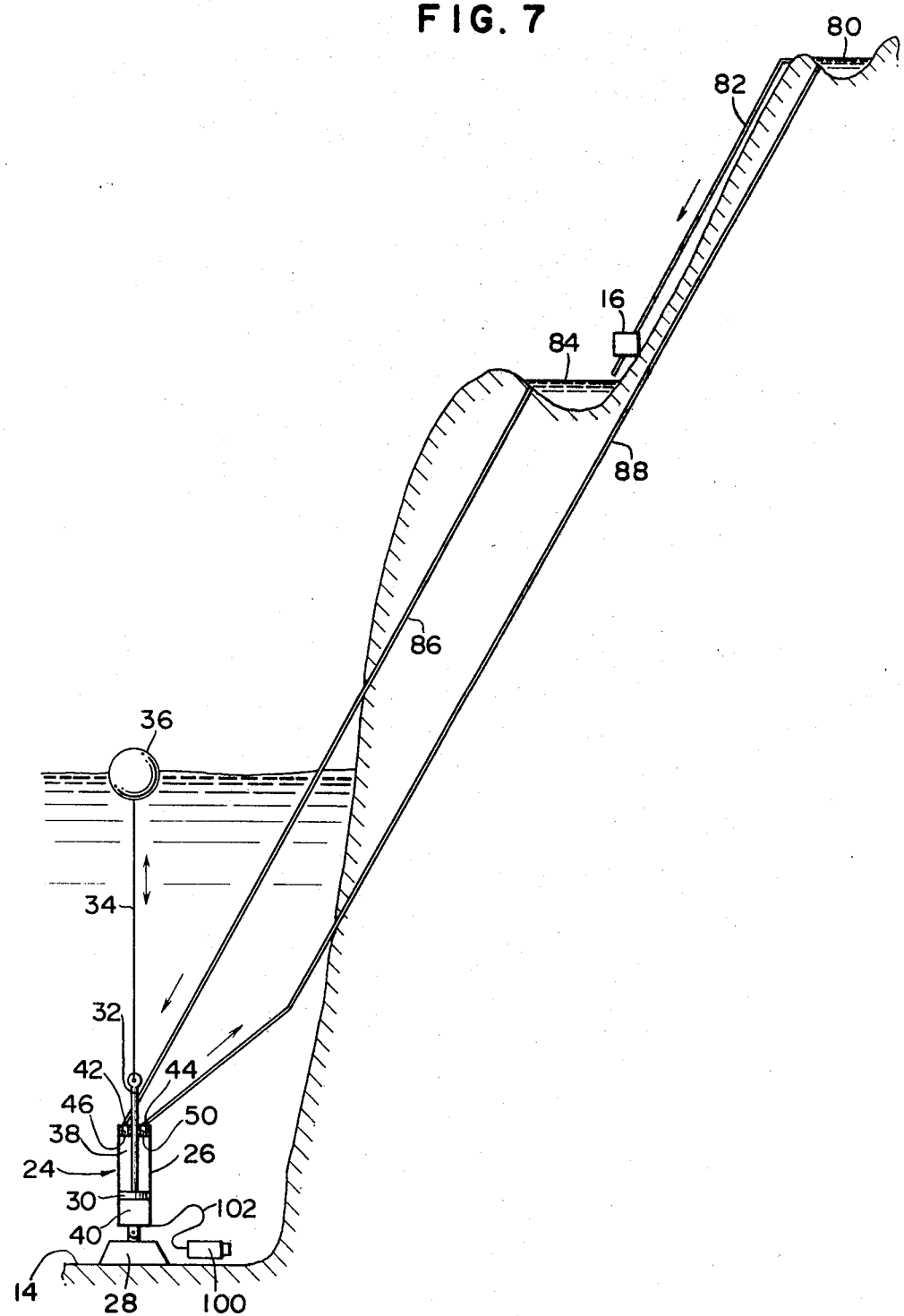
FIG. 7 is a view similar to FIG. 4 but showing a sixth embodiment.

Now, turning to FIG. 7, there is shown a sixth embodiment of the wave activated power generation system. This embodiment is similar to the embodiment shown in FIG. 4, but there is provided no pressure regulating low pressure tank. Instead, the pressure regulating chamber 40 of the piston-cylinder device 24 opens directly to the sea through a filter 100 and a pipe 102, and the low elevation reservoir 84 is located at a position sufficiently higher than the sea surface.

With this arrangement, since the head determined by the water level in the low elevation reservoir 84 and acting in the pumping chamber 38 of the piston-cylinder device 24 is always higher than the head determined by the surface of the sea where the piston-cylinder device 24 is located and acting in the pressure regulating chamber 40 of the piston-cylinder device 24, the difference in head ceaselessly applies a downward force on the piston 30 so that the mooring cable is maintained in a tensed condition.

Thus, the float 36 connected to the downwardly tensed cable 34 vertically displaces in accordance with the actual vertical displacement of the sea surface caused by the waves, so as to greatly reciprocate the piston 30. Therefore, the piston-cylinder device 24 draws the water by suction from the low elevation reservoir 84 and pumps up the water to the high elevation reservoir 80 so that the generator 16 continues to be driven by the falling water from the high elevation reservoir 80. In this case, the circulated water is preferably fresh water.

Figure 8:
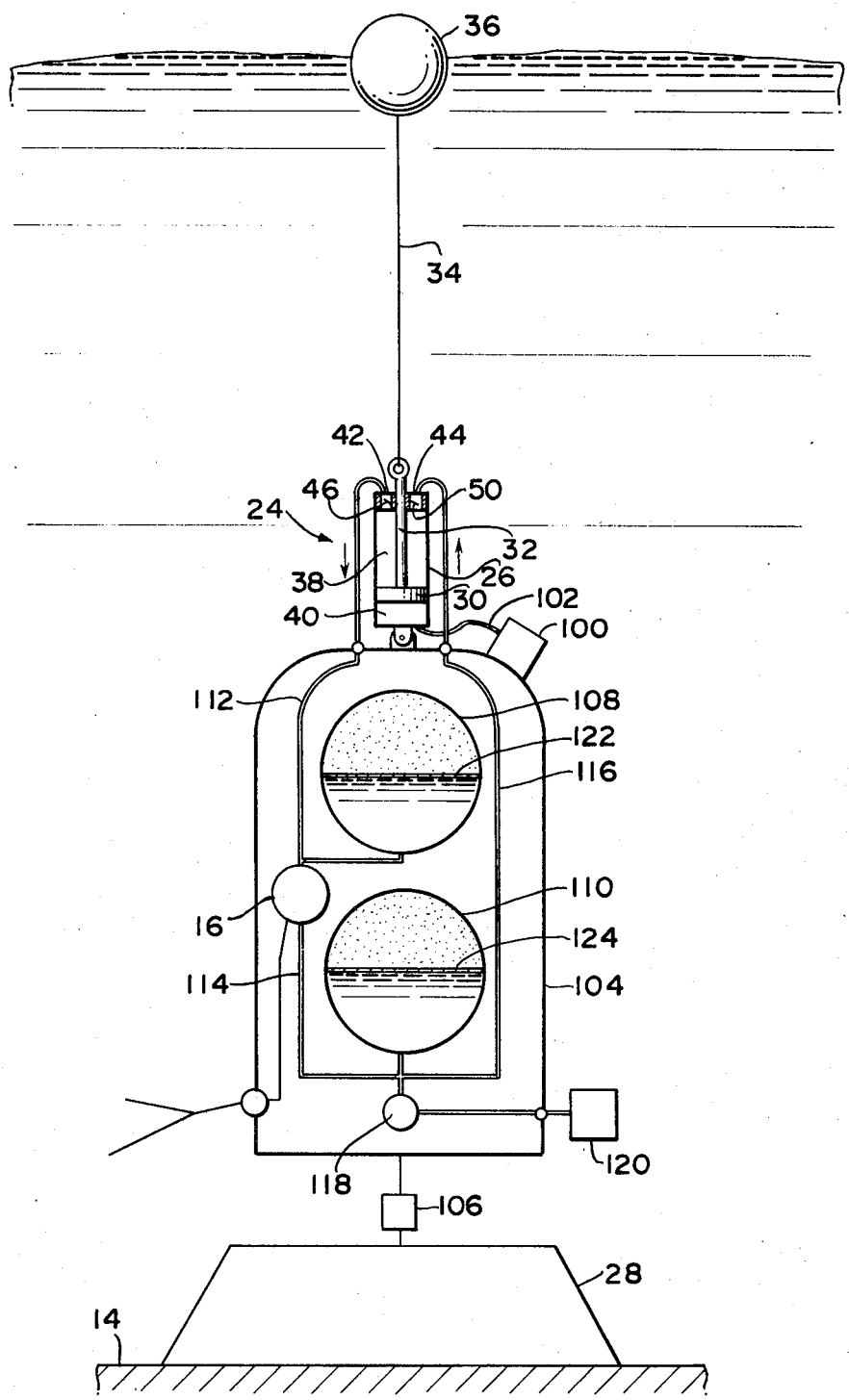
FIG. 8 is a sectional view of a seventh embodiment.

FIG. 8 shows a modification of the system shown in FIG. 7. In this embodiment, the cylinder 26 of the piston-cylinder device 24 is connected to the weight 28 through a waterproof housing 104 and a releasable universal joint 106. Within the waterproof housing 104, there are located a high pressure tank 108 and an intermediate pressure tank 110 together with the waterwheel generator 16. The exhaust port 42 of the pumping chamber 38 of the piston-cylinder device 24 is connected through a pipe 112 to the bottom of the high pressure tank 108. The bottom of the tank 108 is also connected to the water intake port of the waterwheel generator 16 whose exhaust port is connected through an exhaust pipe 114 to the bottom of the intermediate pressure tank 110. The bottom of the tank 110 is also connected through a pipe 116 to the intake port 44 of the pumping chamber 38. The tank 110 is provided with a pump 118 for supplying supplmentary water to the tank 110 when the water level in the tanks 108 and 110 drops below a predetermined level because of leakage of water from the tanks. The intake port of the pump 118 may be provided with a filter 120.

The tanks 108 and 110 are respectively divided by flexible membranes 122 and 124 into an upper chamber and a lower chamber. The upper chamber of the tank 108 is charged with a compressed gas such as a saturated Freon R-22 gas (chloradifluoromethane) which can maintain the gas pressure substantially at a constant level for a long period, so that the water in the lower chamber is pressurized through the membrane 122 by the compressed gas. The upper chamber of the tank 110 is charged with a compressed gas such as a saturated Freon R-12 gas (dichlorodifluoromethane) so as to put the water in the lower chamber under pressure. The pressure in the tank 108 is adapted to be higher than the pressure in the tank 110 so that the difference in pressure produces a stream of water flowing from the high pressure tank 108 through the generator to the intermediate pressure tank 110. In addition, the pressure in the tank 110 is adapted to be higher than the head acting in the pressure regulating chamber 40 of the piston-cylinder device 24 and determined by the distance between the piston-cylinder device and the surface of the sea, so that the difference in pressure ceaselessly applies a downward force on the piston 30 so as to keep the mooring cable 34 in a tensed condition.

As seen from the above, this embodiment is advantageous in that the generation system can be unitized. Therefore, a generation plant of a required scale can be easily built by installing under water a required number of generation units which have been previously produced in a factory.

Figure 9:
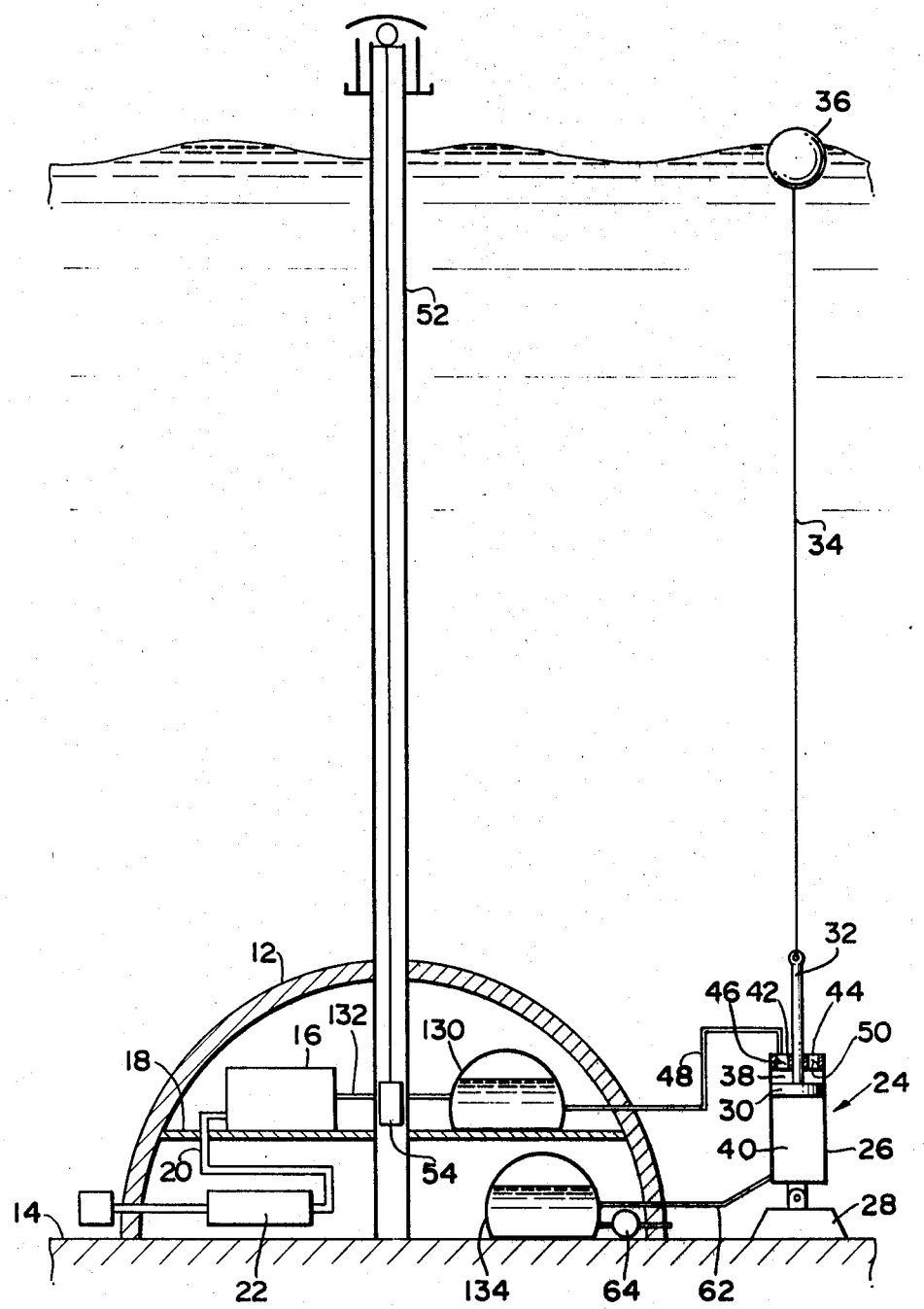
FIG. 9 is a view similar to FIG. 1 but showing an eighth embodiment.

Referring to FIG. 9, there is shown still another modification of the system shown in FIGS. 1 and 2. In this embodiment, an intermediate pressure tank 130 pressurized by a compressed gas is located on the support floor 18. The bottom of the tank 130 is connected to an exhaust pipe 132 of the waterwheel generator 16 and also connected through the pipe 48 to the intake port 42 of the piston-cylinder device 24. The pressure regulating chamber 40 of the piston-cylinder device 24 is connected through the pipe 62 to a lower portion of a low pressure tank 134 pressurized by a compressed gas. The intermediate pressure tank 130 is pressurized to have a pressure lower than the head acting on the exhaust port 44 of the piston-cylinder device 24, and the low pressure tank 134 is pressurized to have a pressure lower than the pressure in the tank 130. In this case, the low pressure tank 134 may be a tank communicating with the atmosphere, similarly to the system shown in FIG. 1.

Figure 10:
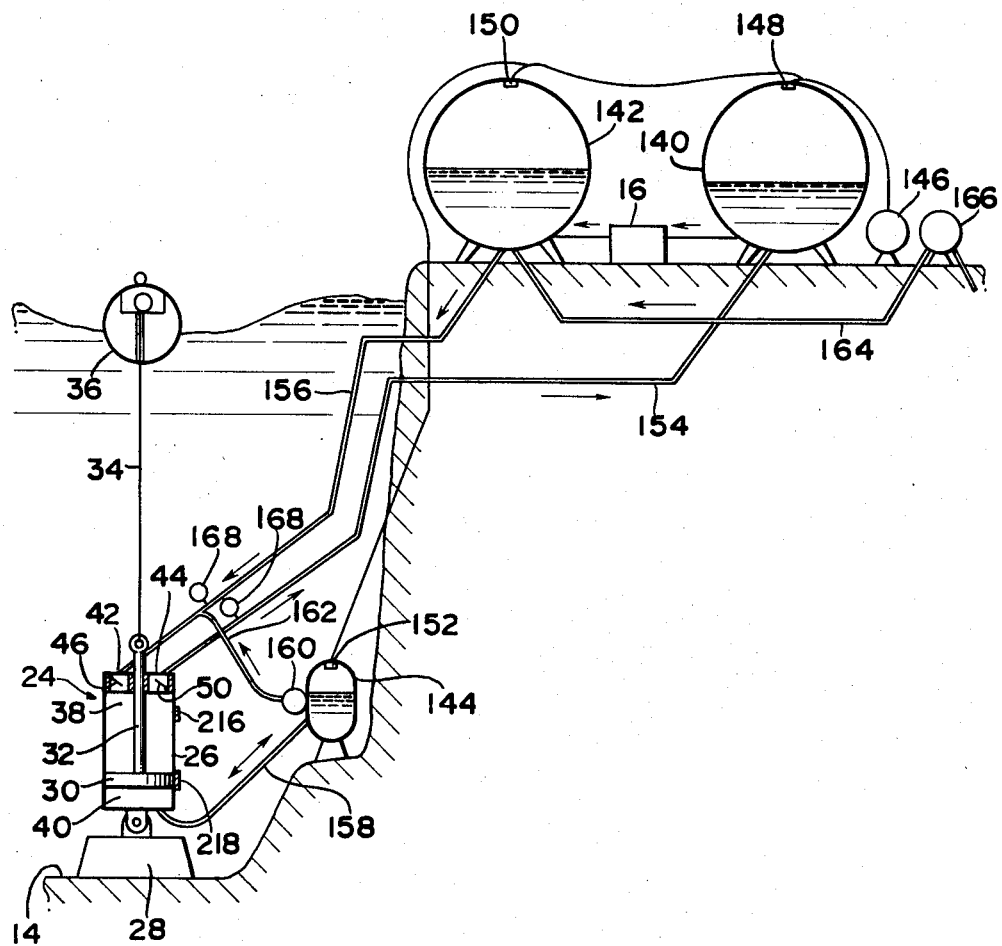
FIG. 10 is a view similar to FIG. 4 but showing a ninth embodiment.

Turning to FIG. 10, there is shown a ninth embodiment of the wave activated power generation system. This system comprises a high pressure tank 140, an intermediate pressure tank 142 and a low pressure tank 144. The tank 140 is connected to an air compressor 146 through a pressure regulating valve 148 which is provided on an upper and of the tank 140 and is adapted to keep the tank in a high pressure condition. The tank 142 is connected to the air compressor 146 through a pressure regulating valve 150 which is provided on a top portion of the tank 142 and is adapted to maintain the pressure in the tank 142 at an intermediate pressure lower than that in the tank 140. The tank 144 is also connected to the compressor 146 through a pressure regulating valve 152 provided on an upper end of the tank 144 and adapted to keep the tank 144 at a low pressure lower than the pressure in the tank 142. The bottom of the tank 140 is connected through the waterwheel generator 16 to the bottom of the tank 142 so that the generator is driven by a flow of water from the tank 140 to the tank 142. The bottom of the tank 140 is connected through a pipe 154 to the exhaust port 44 of the piston-cylinder device 24, and the bottom of the tank 142 is connected through a pipe 156 to the intake port 42. The bottom of the tank 144 is connected to the pressure regulating chamber 40 through a pipe 158.

The tanks 140 and 142, the generator 16 and the compressor 146 are located on land, and the tank 144 is located on the sea bottom. The tank 144 is provided with a drain pump 160 having an outlet pipe 162 connected to the pipe 156 so that the water leaking from the pumping chamber 38 through the clearance between the piston and the cylinder to the low pressure regulating chamber 40 is returned to the pumping chamber 38. The bottom of the tank 142 is also connected through a pipe 164 to another pump 166 which is adapted to supply supplementary water to the tank so as to compensate for leakage of water from a circulating loop consisting of the generator 16, the tanks 140 and 142 and the pumping chamber 38 of the piston-cylinder device 24. In this case, the water flowing in the circulating loop is preferably fresh water. If necessary, each of the pipes 154 and 156 may be provided with a water hammering absorber 168. In this embodiment, since the head determined by the depth from the sea surface is not utilized at all, the system can be installed in a shallow sea area.

Figure 11:
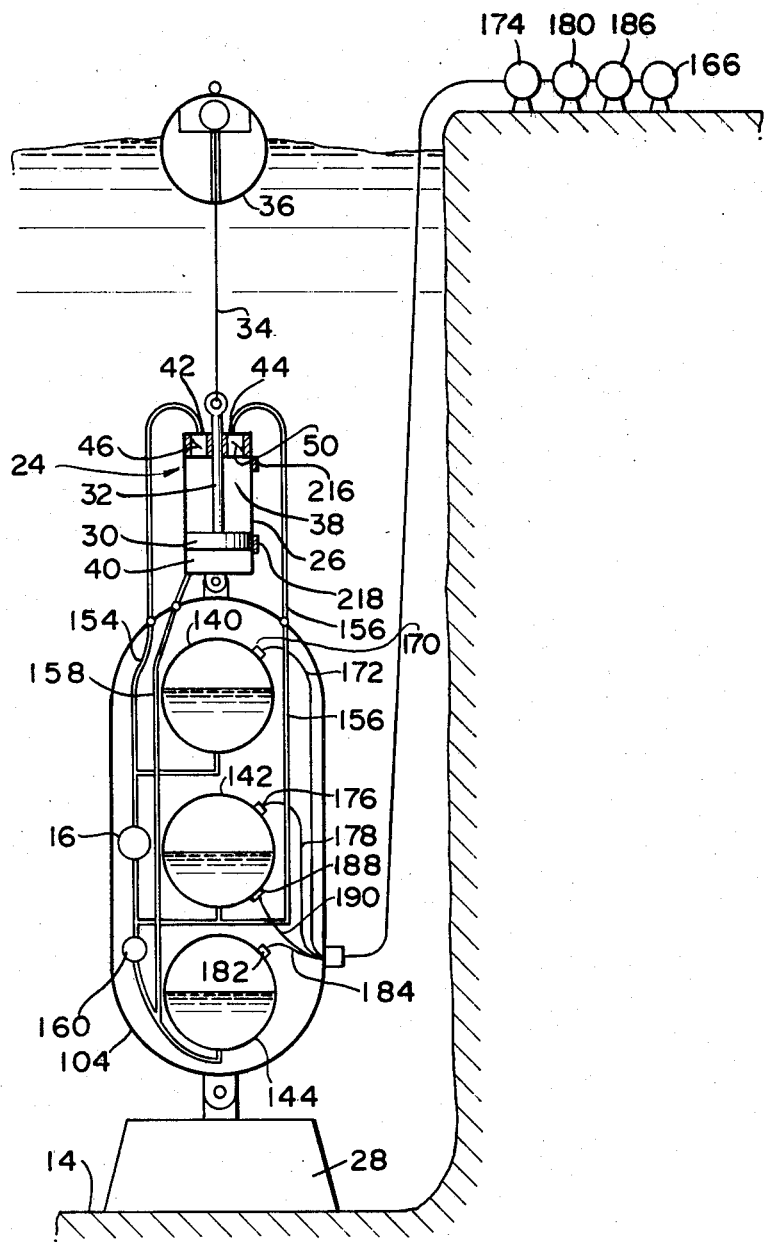
FIG. 11 is a view similar to FIG. 8 but showing a tenth embodiment.

FIG. 11 shows a modification of the system shown in FIG. 10. In this embodiment, the generator 16 and the high pressure, intermediate pressure and low pressure tanks 140, 142 and 144 are located in the waterproof capsule 104. The tank 140 has a high pressure check valve 170 mounted on a top portion thereof and connected through an air pipe 172 to a high pressure air compressor 174 located on land, and the tank 142 has an intermediate pressure check valve 176 mounted on a top portion thereof and connecting through an air pipe 178 to an intermediate pressure air compressor 180. The tank 144 has a low pressure check valve 182 mounted on a top portion thereof and connected through an air pipe 184 to a low pressure air compressor 186. The tank 142 also has a water level adjusting valve 188 mounted on the bottom thereof and connected through a pipe 190 to the supplementary water supplying pump 166 located on land. This embodiment is advantageous in that the system can be unitized and can be installed in any sea area without being limited by the depth of the sea. In addition, fresh water can be used as the circulating water.

Figure 12:
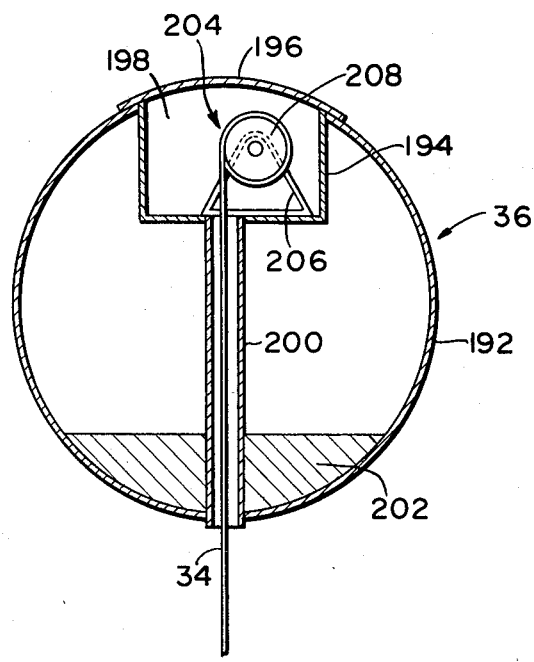
FIG. 12 is a sectional view of the float use in the wave activated power generation system.

FIG. 12 is a sectional view of the float 36 used in the aforementioned wave activated power generation systems. The float 36 comprises a hollow spherical member 192 and a box 194 fixed to an upper portion of the spherical member 192 and cooperating with a cover 196 to define a winch chamber 198. A tube 200 downwardly extends from the bottom of the box 194 and projects slightly from the bottom of the spherical member 192. The spherical member 192, the box 194 and the cover 196 are watertightly secured to one another. If necessary, a reinforcing plate 202 may be located between the lower portion of the tube 200 and the bottom of the spherical member 192. If desired, the float is airtightly formed and is charged with a suitable gas such as a saturated Freon 12 gas.

Figure 13:
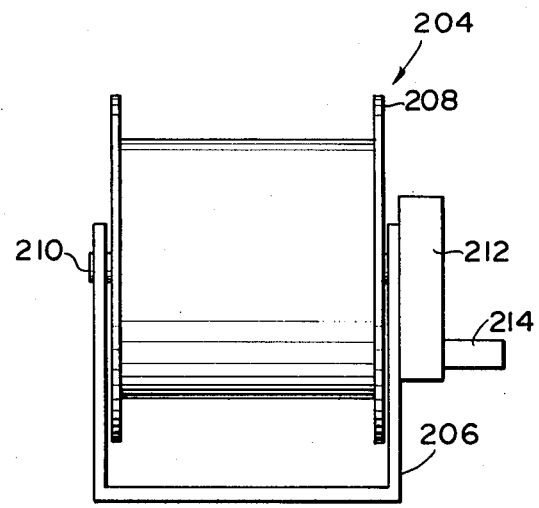
FIG. 13 is a plan view of the mooring cable winding drum used in the float shown in FIG. 12.

Within the winch chamber 198, there is located a winch 204 which includes a stand 206 put on the bottom of the box 194 and a drum 208 fixed to a horizontal shaft 210 rotatably supported by the stand 206, as shown in FIG. 13. The shaft 210 is driven through a gear box 212 by an electric motor 214.

As seen from FIG. 12, the upper portion of the mooring cable 34 extends through the tube 200 into the winch chamber 198 and the upper end of the cable is fixed to the drum 208, so that the mooring cable can be wound up around the drum 208. Therefore, when it is necessary to adjust the length of the mooring cable because of variation of the tidal level, the motor is operated to wind or unwind the cable. In this case, in order to automatically adjust the length of the mooring cable, the piston-cylinder device 24 may be provided with a pair of proximity detectors 216 and 218, as shown in FIGS. 10 and 11. One of the detectors 216 is positioned slightly below the upper dead point of the piston 30 so as to detect the piston 30 just before it reaches its upper dead point, thereby causing the winch 204 to unwind the mooring cable. The other detector 218 is positioned slightly above the lower dead point of the piston 30 so as to detect the piston 30 just before it reaches its lower dead point, thereby causing the winch 204 to wind the mooring cable. In addition, when the wave becomes very high or strong because of stormy weather or when a large amount of flotages are driven to the float, the motor 214 is operated to put the float at a sufficient depth under the sea surface. In this case, if it is necessary to submerge deeply the float, the winch 204 is made waterproof in structure, if desired.

The invention has thus been shown and described with reference to specific embodiments. However, it should be noted that the invention is in no way limited to the details of the illustrated structures but changes and modifications may be made without departing from the scope of the appended claims.

I claim:

1. A wave activated power generation system of the float type comprising at least one piston-cylinder means having an anchored cylinder and a piston slidable in said cylinder and cooperating with said cylinder to form a first chamber above said piston and a second chamber below said piston, said cylinder having an intake port and an exhaust port both formed at an upper portion thereof to communicate with said first chamber and each provided with a check valve means; float means connected through a cable to said piston of said piston-cylinder means; first fluid storage means connected to said intake port of said first chamber for supplying said first chamber with a fluid under a first pressure; second fluid storage means connected to said exhaust port of said first chamber to receive the fluid supplied from said first chamber by pumping action of said piston caused by vertical displacement of said float due to waves, said second fluid storage means being adapted to cause a second pressure higher than said first pressure to act on said check valve of said exhaust port of said first chamber; a waterwheel generator having an inlet connected to said second fluid storage means and an outlet connected to said first fluid storage means so that said generator is driven by the flow of fluid from said second fluid storage means to said first fluid storage means; and pressure regulating means connected to said second chamber for maintaining said second chamber at a third pressure lower than said first pressure, the difference in pressure between said first and second chambers ceaselessly applying a downward force on said piston to maintain said cable in a tensed condition.

2. A wave activated power generation system in accordance with claim 1 wherein said pressure regulating means is a low pressure tank communicating at an upper portion thereof with the atmosphere and adapted to have a free water surface lower than the surface of the sea so as to supply said second chamber with water of said third pressure lower than said first pressure.

3. A wave activated power generation system in accordance with claim 2 wherein said exhaust port of said piston-cylinder means and said inlet of said waterwheel generator are adapted to open to the sea so that the water surrounding said piston-cylinder means acts as said second fluid storage means, and wherein said first fluid storage means is an intermediate pressure tank connected to said outlet of said waterwheel generator and adapted to supply said first chamber with water of said first pressure lower than the head at said exhaust port of said piston-cylinder means.

4. A wave activated power generation system in accordance with claim 3 wherein said intermediate pressure tank is located above said first chamber of said piston-cylinder means and communicates at an upper portion thereof with the atmosphere so as to have a free water surface lower than the surface of the sea but higher than the free water surface in said low pressure tank.

5. A wave activated power generation system in accordance with claim 4 wherein said generator and said low pressure tank are located in a waterproof housing and said intermediate pressure tank is located at an intermediate portion of a tower projecting upwardly from said waterproof housing and emerging from the surface of the water.

6. A wave activated power generation system in accordance with claim 5 wherein said waterproof housing is installed on the bottom of the sea.

7. A wave activated power generation system in accordance with claim 5 wherein said waterproof housing and said piston-cylinder means are supported by a structure which floats in the sea.

8. A wave activated power generation system in accordance with claim 2 wherein said first fluid storage means is a first reservoir located at an elevation higher than the surface of the sea and said second fluid storage means is a second reservoir located at an elevation higher than said first reservoir, said waterwheel generator being located at an elevation between said first and second reservoirs.

9. A wave activated power generation system in accordance with claim 2 wherein said intake port of said piston-cylinder means is adapted to open to the sea so that the water surrounding said piston-cylinder means acts as said first fluid storage means, and wherein said second fluid storage means is a reservoir located at an elevation higher than the surface of the sea, said waterwheel generator being located at an elevation between the surface of the sea and said reservoir.

10. A wave activated power generation system in accordance with claim 9 wherein said intake port of said piston-cylinder means opens to the sea through a filter means.

11. A wave activated power generation system in accordance with claim 2 wherein said second fluid storage means is a high pressure tank pressurized by a compressed gas so that a pressure higher than the pressure of the water surrounding said piston-cylinder means acts on said check valve of said exhaust port of said first chamber.

12. A wave activated power generation system in accordance with claim 11 wherein said first fluid storage means is a reservoir located on land.

13. A wave activated power generation system in accordance with claim 2 wherein said low pressure tank opens to the atmosphere through a duct extending from the upper portion of said low pressure tank to a position higher than the surface of the sea.

14. A wave activated power generation system in accordance with claim 2 wherein said low pressure tank is provided with pump means for draining water from said low pressure tank so as to prevent elevation of the water level in said low pressure tank caused by the water leaking into said low pressure tank.

15. A wave activated power generation system in accordance with claim 1 wherein said second chamber of said piston-cylinder means is adapted to open to the sea so that the water surrounding said piston-cylinder means acts as said pressure regulating means.

16. A wave activated power generation system in accordance with claim 15 wherein said first fluid storage means is a first reservoir located at an elevation higher than the surface of the sea and said second fluid storage means is a second reservoir located at an elevation higher than said first reservoir, said waterwheel generator being located at an elevation between said first and second reservoirs.

17. A wave activated power generation system in accordance with claim 15 wherein said first fluid storage means is an intermediate pressure tank pressurized by a compressed gas at an intermediate pressure higher than the pressure of the water surrounding said piston-cylinder means and said second fluid storage means is a high pressure tank pressurized by a compressed gas at a pressure higher than said intermediate pressure.

18. A wave activated power generation system in accordance with claim 17 wherein said waterwheel generator and said intermediate pressure and high pressure tanks are located in a waterproof housing installed in the sea.

19. A wave activated power generation system in accordance with claim 17 or 18 wherein said intermediate pressure tank is provided with pump means for supplying supplementary water to said intermediate pressure tank so as to compensate for leakage of water from said tanks.

20. A wave activated power generation system in accordance with claim 1 wherein said pressure regulating means is a low pressure tank pressurized by a compressed gas so as to supply said second chamber with a fluid of a pressure lower than said first pressure.

21. A wave activated power generation system in accordance with claim 20 wherein said exhaust port of said piston-cylinder means and said inlet of said waterwheel generator are adapted to open to the sea so that the water surrounding said piston-cylinder means acts as said second fluid storage means, and wherein said first fluid storage means is an intermediate pressure tank connected to said outlet of said waterwheel generator and pressurized by a compressed gas to supply said first chamber with water of a first pressure lower than the head at said exhaust port of said piston-cylinder means.

22. A wave activated power generation system in accordance with claim 20 wherein said first fluid storage means is an intermediate pressure tank pressurized by a compressed gas so as to supply said first chamber with a fluid of said first pressure and wherein said second fluid storage means is a high pressure tank pressurized by a compressed gas to cause a pressure higher than said first pressure to act on said check valve of said exhaust port of said first chamber.

23. A wave activated power generation system in accordance with claim 22 wherein said intermediate and high pressure tanks are installed on the land.

24. A wave activated power generation system in accordance with claim 22 wherein said low, intermediate and high pressure tanks and said generator are located in a waterproof housing anchored in the water.

25. A wave activated power generation system in accordance with claim 3 or 21 wherein a number of piston-cylinder means are associated with one waterwheel generator, said outlet of said waterwheel generator being connected to the intake port of each piston-cylinder means.

26. A wave activated power generation system in accordance with claim 1 wherein said float includes a hollow float member, and a winding drum located within said float member and adapted to be driven by an electric motor, said cable being wound around said drum and extending through a lower portion of said float member to said piston of said piston-cylinder means.

* * * * *